(12) United States Patent
Liao et al.

(10) Patent No.: US 10,387,768 B2
(45) Date of Patent: Aug. 20, 2019

(54) ENHANCED RESTRICTED BOLTZMANN MACHINE WITH PROGNOSIBILITY REGULARIZATION FOR PROGNOSTICS AND HEALTH ASSESSMENT

(71) Applicant: Palo Alto Research Center Incorporated, Palo Alto, CA (US)

(72) Inventors: Linxia Liao, Fremont, CA (US); Wenjing Jin, Cincinnati, OH (US)

(73) Assignee: PALO ALTO RESEARCH CENTER INCORPORATED, Palo Alto, CA (US)

(\*) Notice: Subject to any disclaimer, the term of this patent is extended or adjusted under 35 U.S.C. 154(b) by 337 days.

(21) Appl. No.: 15/232,639

(22) Filed: Aug. 9, 2016

(65) Prior Publication Data

US 2018/0046902 A1 Feb. 15, 2018

(51) Int. Cl.
  *G06N 3/04* (2006.01)
  *G06N 3/08* (2006.01)
(52) U.S. Cl.
  CPC ......... *G06N 3/0472* (2013.01); *G06N 3/0445* (2013.01); *G06N 3/0454* (2013.01); *G06N 3/088* (2013.01)
(58) Field of Classification Search
  CPC .................................................. G06N 3/0472
  See application file for complete search history.

(56) References Cited

U.S. PATENT DOCUMENTS

2018/0217585 A1\* 8/2018 Giering ............. G05B 23/0254

\* cited by examiner

*Primary Examiner* — Yu-Hsi D Sun
(74) *Attorney, Agent, or Firm* — Shun Yao; Park, Vaughan, Fleming & Dowler LLP

(57) ABSTRACT

Embodiments of the present invention provide an enhanced Restricted Boltzmann Machine (RBM) system with a novel regularization term to generate features automatically that are suitable for predicting remaining useful life (RUL) of engineered systems such as machines, tools, apparatus, or parts. The system improves the trendability of the output features, which may better represent the degradation pattern of such systems. The disclosed system has been demonstrated to improve trendability and RUL prediction accuracy, offering improved predictive power earlier in the life cycle of the machine, tool, or part. During operation, the system implements an RBM including a loss function. The system then extracts a set of features from a degradation measurement via the RBM. The system fits a rate-of-change slope for a respective feature and adds a regularization term to the loss function based on the fitted slope. The system then selects a subset of the enhanced features based on a measure of monotonic trending and aggregates the subset into a health value. The system then predicts a RUL as a weighted average of features best matching a historical degradation pattern in the health value.

20 Claims, 10 Drawing Sheets

ENHANCED RESTRICTED BOLTZMANN MACHINE WITH PROGNOSIBILITY REGULARIZATION FOR PROGNOSTICS AND HEALTH ASSESSMENT

BACKGROUND

Field

The present disclosure relates to prognostics and health assessment for machines, tools, or parts. More specifically, this disclosure relates to a method and system for improved remaining useful life (RUL) prediction via an enhanced Restricted Boltzmann Machine (RBM).

Related Art

In the emerging Internet-of-Things environment, it is critical to bridge the gap between business decision-making and real-time factory data in order to facilitate the transition from condition-based to predictive maintenance service. Condition monitoring systems have been widely applied in many industries to acquire operation- and equipment-related data, through which current machine health is evaluated. But a key challenge in predicting future machine health is to extract features that are well correlated with fault progression and degradation.

Many methods have been proposed for machine remaining useful life (RUL) prediction. These can be broadly classified as data-driven, physics-based, and hybrid methods. Another approach is event-based methods, such as instance-based methods for RUL estimation used in aircraft engines. Physics-based and hybrid methods generally require detailed knowledge of the assembled components. When such detailed information is unavailable, data-driven methods become the primary prediction approach.

To enable accurate prediction using a data-driven method, feature extraction is a critical step. When building a RUL prediction model, it is necessary to extract features with good monotonic trend to get higher accuracy. For example, if an extracted feature correlates well with the fault propagation process (e.g., root mean square of the vibration signal increases as the machine degrades), a good prediction can be expected from extrapolating the historical observations to the future. However, in some cases most extracted features have no trend until severe degradation starts, e.g. at 90% or more of entire life. Usually, some engineering expertise is needed to guide feature extraction. The required expertise might not be directly available for complex systems, thus an automated feature extraction method would be desirable.

Deep learning, based on learning layers with a network structure in Restricted Boltzmann Machines (RBMs), has recently gained popularity in the machine learning community. The RBM training process requires experience to choose the model parameters. Moreover, initializing the parameters and updating the model present challenges for training a good RBM model. In the learning process, the hidden nodes may be highly correlated, which can lead to overfitting. One research area is designing a regularization term to avoid overfitting and stabilize the learning process. Existing regularization methods include weight decay and sparsity regularization. A weight decay term keeps the weights small and thus enables a close approximation of the likelihood gradient, such as a Tikhonov-type regularization term. Sparsity regularization has been used to limit the activation rate of the hidden nodes. These regularization terms can be used to optimize each hidden node and improve the capability of model reconstruction and prediction.

SUMMARY

One embodiment of the present invention provides a system and method for enhanced remaining useful life (RUL) prediction. During operation, the system implements a Restricted Boltzmann Machine (RBM) including a loss function. The system may then extract a set of features via the RBM, using a degradation measurement as input. The system may then enhance the features within the RBM, which further comprises fitting a rate-of-change slope for a respective feature. The system may add a regularization term, based on the fitted slope and encouraging monotonic trending of the respective feature, to the loss function. The system may then select a subset of the enhanced features based on a measure of monotonic trending of a respective enhanced feature. The system may then aggregate the selected subset of features into a health value. The system may then predict a remaining useful life (RUL) as an average of RUL values for training models weighted by their match to a historical degradation pattern in the health value.

In a variation on this embodiment, the fitted rate-of-change slope for the respective feature may be a slope of a linear regression of the respective feature over time in the degradation measurement. The regularization term may comprise a sum of squares of fitted rate-of-change slopes for respective features.

In a variation on this embodiment, the linear regression further comprises a weighted least squares regression or a sparse linear regression.

In a variation on this embodiment, the system may implement a Self-Organizing Map (SOM) including a distance map. The system then compares the SOM structure using the extracted lifecycle features to the healthy baseline features, which further comprises determining a best matching unit (BMU) as a closest vector representation to the degradation measurement in the SOM network, according to the distance map. The system then identifies the health value as a minimum quantization error (MQE), which is a distance, according to the distance map, of the best matching unit to the degradation measurement.

In a variation on this embodiment, the distance map may include one or more of a Euclidean distance, a Mahalanobis distance, and a cosine similarity measure. The distance map may act on a weight vector associated with a feature and a vector representation of an input.

In a variation on this embodiment, the measure of monotonic trending may comprise a count of first-order differences of the respective feature from a hidden node having a same sign, and a count of second-order differences of the respective feature from the hidden node having the same sign. The system may further evaluate a measure of prognosibility based on a standard deviation in the measure of monotonic trending with respect to features and hidden nodes.

In a variation on this embodiment, the system may implement a deep learning structure by stacking a layer, comprising a regression or classification method, on an output of the RBM.

In a variation on this embodiment, the system may implement a discriminative classification method to integrate feature extraction and prediction as a unified task.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of improved remaining useful life (RUL) prediction via a Restricted Boltzmann Machine (RBM) with enhanced regularization. The methods and systems disclosed herein can accurately estimate RUL in engineered systems such as machines, tools, apparatus, parts, or instruments, and can improve the monotonic trendability of features extracted from degradation measurements by the RBM. Therefore, the disclosed system can improve the predictive power and accuracy of RUL estimation earlier in the life cycle of the machine, tool, part, or other system. During operation, the system implements an RBM including a loss function. The system then extracts a set of features from a degradation measurement via the RBM. The system fits a rate-of-change slope for a respective feature and adds a regularization term to the loss function based on the fitted slope. The system then selects a subset of the enhanced features based on a measure of monotonic trending and aggregates the subset into a health value. The system then predicts a RUL as a weighted average life based on best matching a historical degradation pattern in the health value.

Restricted Boltzmann Machine (RBM) and Framework for Prediction

Figure 1A:
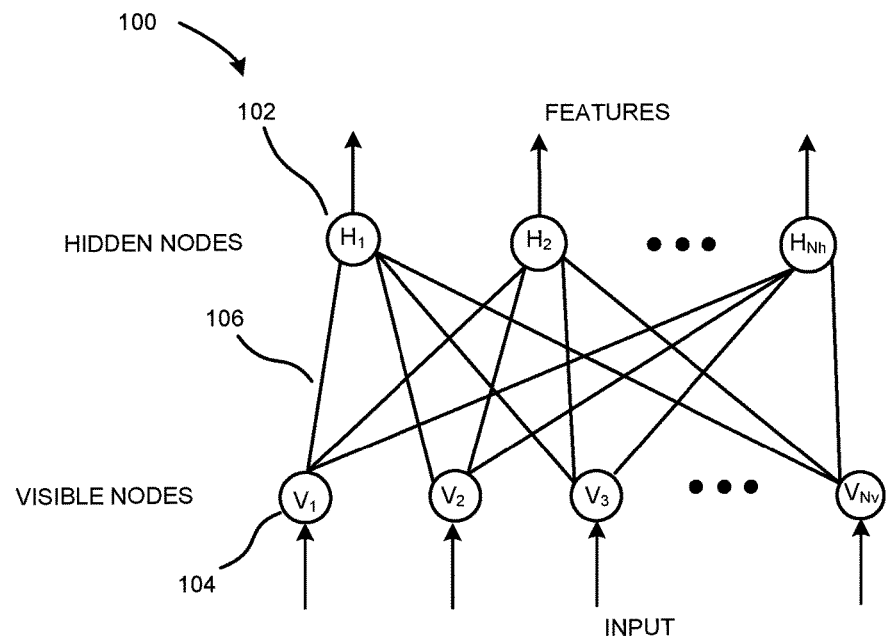
FIG. 1A illustrates an exemplary structure of an RBM model.

FIG. 1A illustrates an exemplary structure 100 of an RBM model. As illustrated in FIG. 1A, an RBM includes the structure of a network or graph with vertices (also called nodes, units, or neurons) and edges (also called links or connections). An RBM is a bipartite graph, meaning that it contains two classes of vertices, hidden nodes such as 102 and visible nodes such as 104, and the edges only connect hidden nodes to visible nodes. For example, as shown in FIG. 1A, edge 106 connects hidden node 102 to visible node 104.

A purpose of RBMs is facilitating machine learning or deep learning. An RBM can be considered a two-layer network, consisting of a visible layer and a hidden layer. As illustrated in FIG. 1A, an RBM processes input units (which are associated with the visible nodes) to extract learned features (associated with the hidden nodes). The two layers may differ in number of units, for example RBM 100 contains Nh hidden nodes $H_1$ through $H_{Nh}$ and Nv visible nodes $V_1$ through $V_{Nv}$.

A key of an RBM is to optimize an energy function E(v, h) that determines probabilities for the states of visible units v and hidden units h. Learning may proceed by sequentially updating the probabilities for each node, so the RBM converges to an equilibrium state where the probabilities no longer change. The energy function is defined as:

$$(v, h) = \sum_{i \in vis} \frac{(v_i - a_i)^2}{2\delta_i^2} + \sum_{j \in hid} \frac{(h_j - b_j)^2}{2\delta_j^2} - \sum_{i,j} \frac{v_i h_j}{\delta_i \delta_j} \omega_{ij}.$$

Here $v_i$, $h_j$ are respectively the states of the visible unit i and hidden unit j, $a_i$, $b_j$ are Gaussian means respectively for visible nodes and hidden nodes, $\delta_i$, $\delta_j$ are their standard deviations, and $\omega_{ij}$ is the weight between them. The probability that the RBM network assigns to a visible vector is given by summing over all hidden vectors:

$$P(v) = \frac{1}{Z} \sum_h \exp(-E(v, h))$$

where $Z = \Sigma_{v,h} \exp(-E(v, h))$. One can define:

$$P(v, h) = \frac{\exp(-E(v, h))}{Z}$$

and $$(h | v) = \frac{\exp(-E(v, h))}{\sum_h \exp(-E(v, h))}.$$

Then using the negative log likelihood gradient to update the parameters ($a_i$, $b_j$, $\delta_i$, $\delta_j$, $\omega_{ij} \in \theta$) results in:

$$\frac{d}{d\theta}(-\log P(v)) = \sum_h P(h | v) \frac{dE(v, h)}{d\theta} - \sum_{v,h} P(v, h) \frac{dE(v, h)}{d\theta}.$$

The positive first term in this equation is called the positive phase contribution and the negative second term is called the negative phase contribution. The RBM may update the parameters through iterations coupling with a learning rate and/or a momentum parameter until a stop criterion is met. The hidden unit states may be used as the extracted features for RUL prediction. Thus, the RBM may act on health degradation measurement data as an input and produce extracted features as an output.

When training the RBM model, a loss function (also called an objective function) based on a negative log likelihood gradient may be used to update the parameters θ. In some embodiments, the system may minimize or optimize the loss function. In some embodiments, the loss function may be defined as follows: $L(\theta) = -\Sigma_{i,j} \log P(v_i, h_j | \theta)$.

Figure 1B:
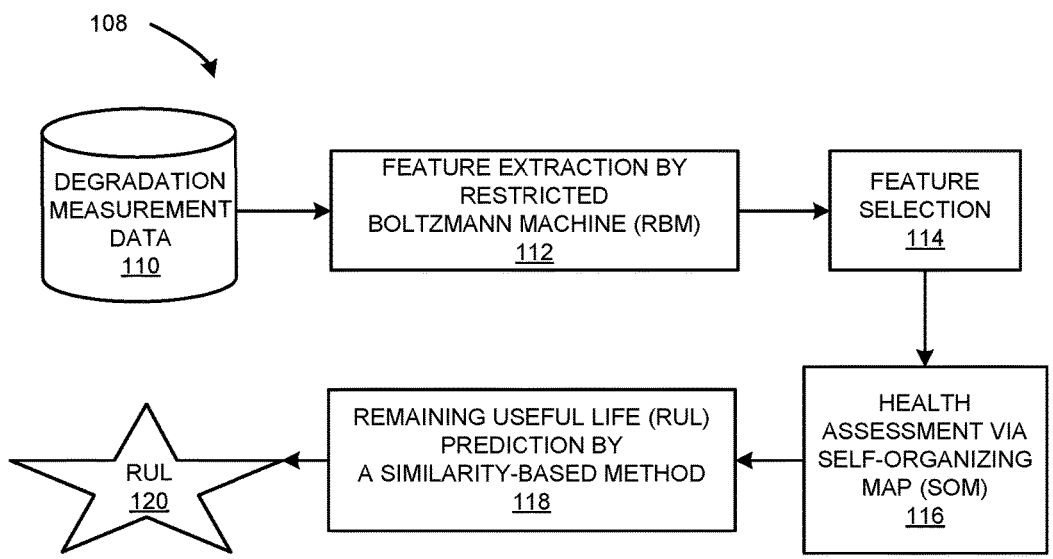
FIG. 1B illustrates a framework for RUL prediction, according to embodiments of the present invention.

FIG. 1B illustrates an overall framework 108 for RUL prediction, according to embodiments of the present invention. As shown, the system may make use of machine health degradation measurement data 110 as input to an RBM. The system may acquire data 110 from measurement directly or via a condition monitoring system. The system may store measurement data 110 in a computer-readable storage medium. The RBM may perform feature extraction 112 on the measurement data 110, as described above. As noted above, in framework 108, the RBM acts on measurement data 110 as an input to produce extracted features as an output. The system may then select features (operation 114) that are likely to achieve the RBM's learning goals. In some embodiments, this selection is performed on the basis of a measure of monotonic trending of the features, thereby improving their likely predictive power for RUL estimation.

The system may then perform a health assessment 116 for the selected features via a self-organizing map (SOM). This health assessment may be based on determining a best matching unit to data 110 among the features, as will be described in more detail below. The system may then use a similarity-based method to perform RUL estimation (operation 118), which can predict the final RUL estimate 120 as a weighted average of the most matched historical degradation patterns. Framework 108 results in RUL estimate 120.

Figure 2:
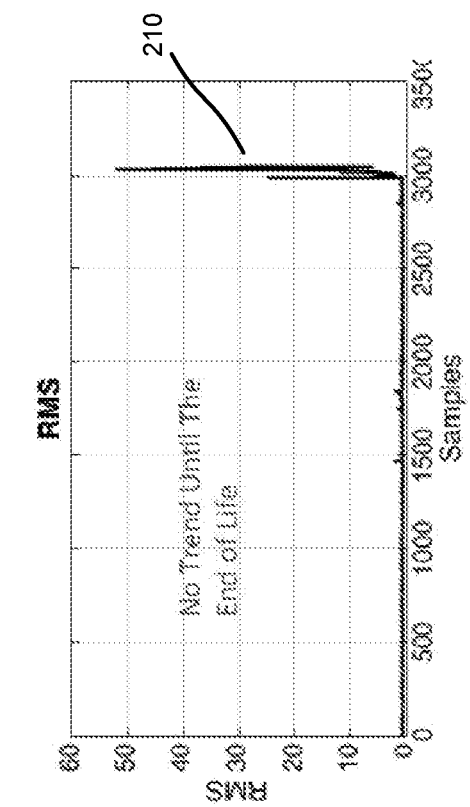
FIG. 2 illustrates good and poor trendability of exemplary features used in RUL prediction.
Figure 2:
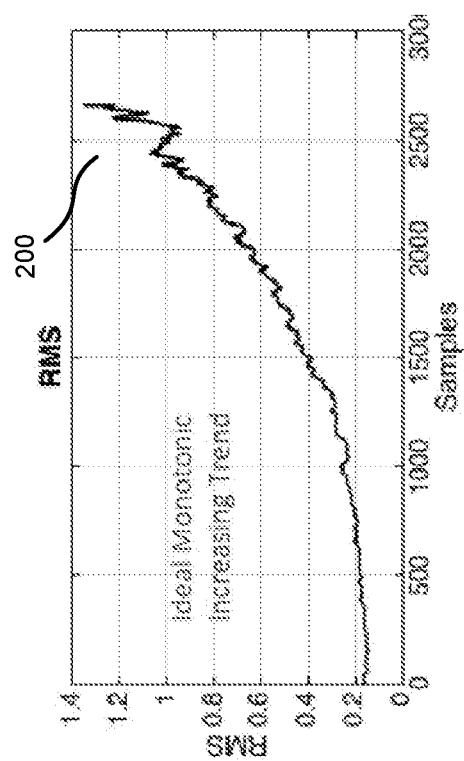

Note that framework 108 depends on the quality of the RBM's learning since, as described above, step 112 uses the RBM to convert input measurement data 110 to the output extracted features. FIG. 2 illustrates good and poor trendability of exemplary features used in RUL prediction. As shown, feature 200 exhibits a root-mean-square (RMS) of vibration that increases monotonically, as the machine degrades. (This property may be referred to as trendability, monotonicity, or monotonic trending. Note the horizontal axis in FIG. 2 refers to samples, which may be taken at regular or irregular time intervals, e.g. one sample every 10 seconds.) Therefore, a prediction of RUL based on features such as 200 would be expected to have good predictive power, leading to accurate estimates relatively far in advance.

On the other hand, feature 210 as shown has poor trendability. Feature 210 exhibits nearly flat behavior, followed by dramatic increases only when approaching the end of life, e.g. at 90% or more of entire life. Such behavior, which may occur in real measurements, makes RBM learning, appropriate feature extraction, and RUL prediction difficult. The systems and methods disclosed herein can enhance the quality of learning and feature extraction by RBM, thereby making RUL prediction better and more accurate from earlier times.

System Architecture

Figure 3:
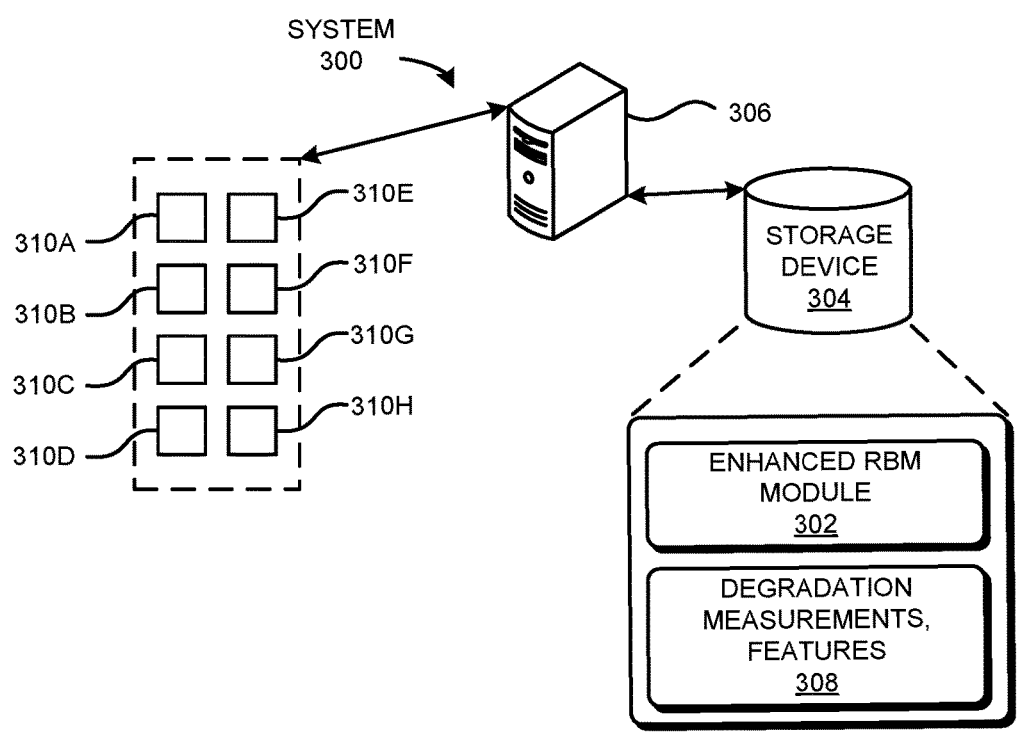
FIG. 3 presents a block diagram illustrating an exemplary architecture of an RBM system utilizing the enhanced regularization method, according to embodiments of the present invention.

FIG. 3 presents a block diagram illustrating an exemplary architecture of an RBM system utilizing the enhanced regularization method, according to embodiments of the present invention. An enhanced RBM system 300 may estimate RUL, according to embodiments, in parallel with multiple processors. In standard systems, system 300 would require strong trendability of features in the measurement data to compute RUL with good predictive power. However, using the methods disclosed herein, system 300 enables the user to estimate RUL accurately earlier in the life of the machine, tool, part, or system.

Enhanced RBM system 300 may include an Enhanced RBM module 302 installed on a storage device 304 coupled to a server 306. Note that various implementations of the present invention may include any number of computers, servers, and storage devices. In various implementations, enhanced RBM module 302 may include an RBM-implementing module or other components of enhanced RBM system 300 to perform the techniques described herein. System 300 may receive data describing degradation measurements and features, and store such data in storage device 304. System 300 may read the code for enhanced RBM module 302 and the data for degradation measurements and features 308 from storage device 304. System 300 may divide degradation measurements, units, or features, and assign them to processors, such as processors 310A-310H, which operate on the assigned measurements, units, or features.

Slope Fitting and Trendability

Figure 4A:
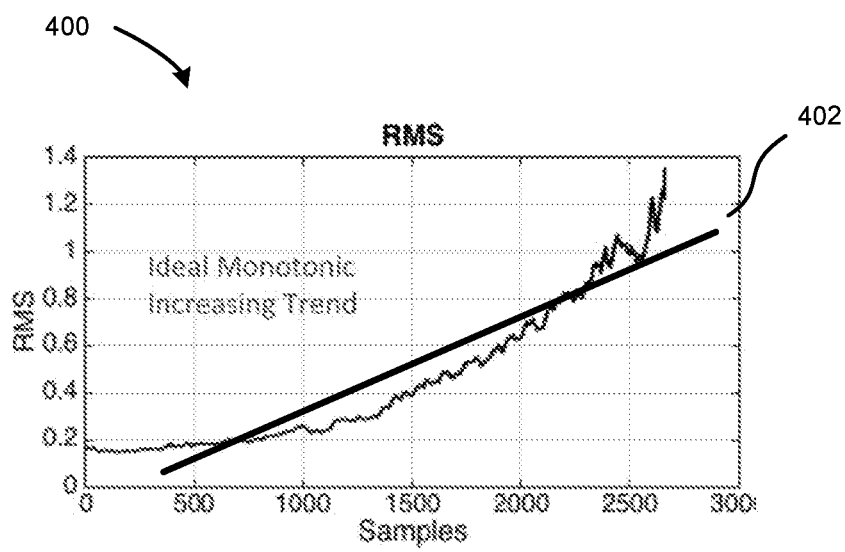
FIG. 4A illustrates fitting a rate-of-change slope for an exemplary feature, according to embodiments of the present invention.

FIG. 4A illustrates fitting a rate-of-change slope for an exemplary feature 400, according to embodiments of the present invention. FIG. 4A shows the same monotonically increasing feature 200 in the degradation measurement vs. time (or equivalently, sample index) from FIG. 2, together with a fitted line 402. As shown, fitted line 402 matches the overall slope and trend of feature 200. Therefore, in some embodiments, the slope of line 402 may be used as a fitted rate-of-change slope for regularization of the RBM loss function.

In some embodiments, line 402 is fitted via linear regression of feature 200 with respect to time (or equivalently, sample index). In some embodiments, the linear regression may include a weighted least squares regression or a sparse linear regression. Other methods for fitting line 402 are also possible, for example a maximum likelihood estimator, higher-order curve-fitting, etc.

Figure 4B:
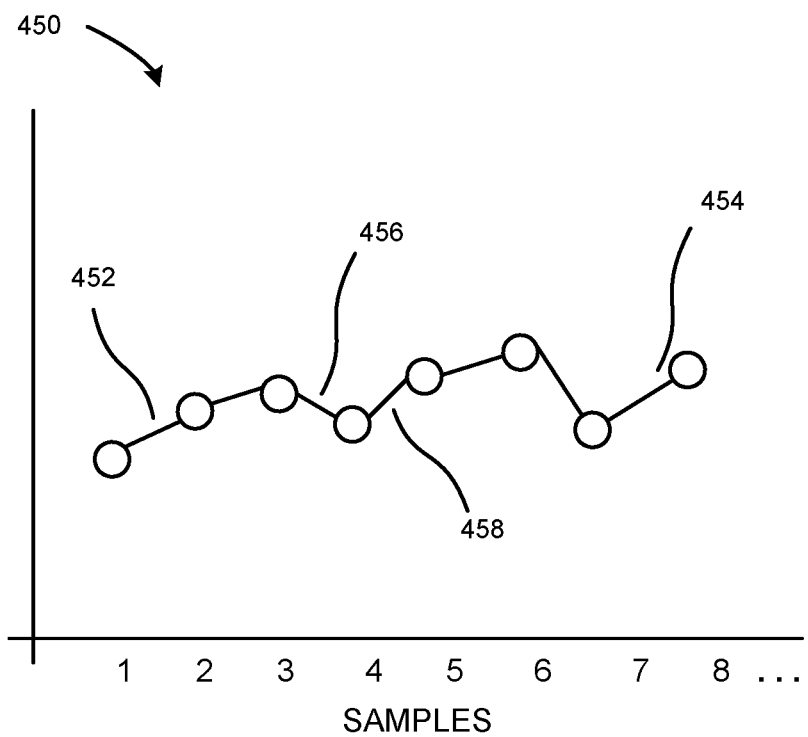
FIG. 4B illustrates a method for evaluating trendability of a feature, according to embodiments of the present invention.

FIG. 4B illustrates a method for evaluating trendability, or a measure of monotonic trending, of a feature 450, according to embodiments of the present invention. In some embodiments, the system uses the measure of monotonic trending to gauge a feature's usefulness for predicting RUL. In some embodiments, the system may base the regularization term on the measure of monotonic trending.

As shown in FIG. 4B, in some embodiments the features in the degradation measurement data are sampled discretely over time during operation of the machine, tool, part, or other engineered system. These samples may be regularly or irregularly spaced over time. In some embodiments, the system may evaluate trendability of a feature in the degradation measurement vs. time (or equivalently, sample index) based on discrete intervals between samples of the feature. In some embodiments, the system may base trendability on a count of first-order differences of the feature having a consistent sign, i.e. positive or negative. In some embodiments, the system may further base trendability on a count of second-order differences of the respective feature from the hidden node having the same sign as the first-order differences. In some embodiments, the system may further base trendability on higher-order differences.

For example, as illustrated in FIG. 4B, intervals 452 and 454 in feature 450 have positive first-order differences, or equivalently, the feature is observed to increase during these intervals. The system may define a positive trendability based on a count of intervals with positive first-order differences, e.g. the system may count intervals 452 and 454 toward positive trendability. Interval 456 has a negative first-order difference, or equivalently, the feature is observed to decrease during this interval. In some embodiments, the system may define a negative trendability based on a count of intervals with negative first-order differences, e.g. the system may count interval 456 toward negative trendability.

In some embodiments, the system may also count a number of intervals in which the feature has second-order differences of a consistent sign toward the trendability measures. For example, the pair of intervals 456 and 458 may be associated with a positive second-order difference, since the first-order differences increase from a negative difference in interval 456 to a positive difference in interval 458. The pair of intervals 456 and 458 may therefore count toward positive trendability.

In some embodiments, the system may define positive and negative trendability according to:

$$T_{ij}^+ = \frac{\text{Count}[\delta Y_{ij} > 0]}{N-1} + \frac{\text{Count}[\delta^2 Y_{ij} > 0]}{N-2}$$

and $$T_{ij}^- = \frac{\text{Count}[\delta Y_{ij} < 0]}{N-1} + \frac{\text{Count}[\delta^2 Y_{ij} < 0]}{N-2},$$

respectively. Here $Y_{ij}$ is feature i from hidden node j, N is the number of samples, $\delta Y_{ij}$ is a first-order difference in $Y_{ij}$, $\delta^2 Y_{ij}$ is a second-order difference in $Y_{ij}$, and Count[ . . . ] counts the first- or second-order differences with the given signs. Note that in some embodiments, $\delta Y_{ij}$ may be replaced by $\delta Y_{ij}/\delta t$, i.e. a discrete approximation to a derivative with respect to time that involves dividing by a time interval. Likewise, in some embodiments $\delta^2 Y_{ij}$ may be replaced by $\delta^2 Y_{ij}/\delta t^2$, i.e. a discrete approximation to a second derivative with respect to time.

In some embodiments, the system may further evaluate a measure of prognosibility based at least on a standard deviation in the measure of monotonic trending with respect to variations among features and hidden nodes. In some embodiments, the system may define prognosibility according to: prognosibility=$1-\text{std}(T_{all})$, where $T_{all}$ includes both positive and negative trendability. In some embodiments, the system may also define a slope value of all features according to: $\text{Slope}_{All}=\Sigma_j^{NH}|\beta_j|$, where j is an index of hidden nodes, Nh is the number of hidden nodes, and $\beta_j$ is a fitted rate-of-change slope for the jth feature.

Method for Enhanced RUL Prediction

Figure 5:
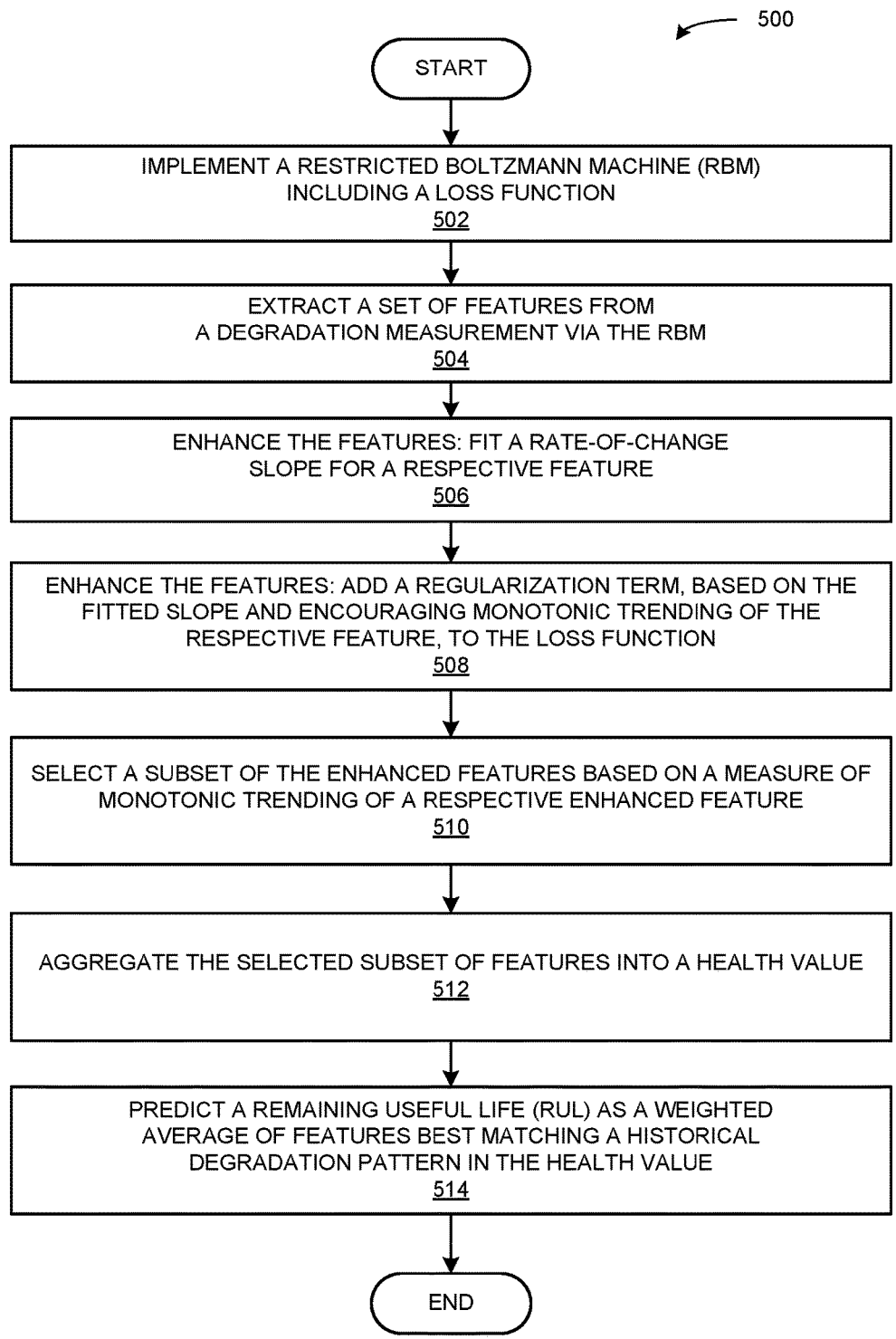
FIG. 5 presents a block diagram illustrating a method for enhanced RUL prediction according to embodiments of the present invention.

FIG. 5 presents a block diagram illustrating a method 500 for enhanced RUL prediction according to embodiments of the present invention. In some embodiments, method 500 works by regularizing the loss function according to $L_\Omega(\theta)=L(\theta)+\lambda\Omega(\theta)$, where $L(\theta)$ is the original loss function, $\Omega(\theta)$ is the regularization term, and $\lambda$ is a weight.

During operation, the system implements an RBM, including a loss function (operation 502). In some embodiments, the loss function may be defined as: $L(\theta)=-\Sigma_{i,j} \log P(v_i, h_j|\theta)$. The system may then extract a set of features from a health degradation measurement via the RBM (operation 504).

The system may then enhance the features within the RBM. The system may fit a rate-of-change slope for a respective feature (operation 506). In some embodiments, the fitted rate-of-change slope is a slope of a linear regression of the respective feature with respect to time (or equivalently, sample index) in the degradation measurement. In some embodiments, the fitted rate-of-change slope $\beta_j$ from linear regression of the jth hidden node $y_{kj}=\text{sigm}\{\Sigma_i \omega_{ij} V_{ki}+C_j\}$ is estimated by $$\beta_j = \frac{\sum_k^N (x_k - \bar{x})(y_k - \bar{y})}{\sum_k^N (x_k - \bar{x})^2}.$$

Here x represents time (or sample index), N is the number of samples, $\bar{x}=\Sigma_k^N x_k/N$, and $\bar{y}=\Sigma_k^N y_k/N$. For example, if measurements are sampled at equal time intervals so $x_k=k$, then $$\beta_j = \frac{y_{1j} + 2y_{2j} + \ldots + Ny_{Nj} - N\bar{y}(N+1)/2}{1^2 + 2^2 + \ldots + N^2 - N\left(\frac{N+1}{2}\right)^2}.$$

In some embodiments, the linear regression includes a weighted least squares regression or a sparse linear regression. Other methods for fitting the rate-of-change slope are also possible, for example a maximum likelihood estimator, higher-order curve-fitting, etc. In some embodiments, responsive to determining that more features remain to be fitted, the system may then return to operation 506 and fit a rate-of-change slope for another respective feature.

The system may then add a regularization term, based on the fitted slope and encouraging monotonic trending of the respective feature, to the loss function (operation 504). In some embodiments, the regularization term is added to the loss function according to $L_\Omega(\theta)=L(\theta)+\lambda\Omega(\theta)$, where $L(\theta)$ is the original loss function, $L_\Omega(\theta)$ is the regularized loss function, $\Omega(\theta)$ is the regularization term, and $\lambda$ is a weight. In some embodiments, the regularization term includes a sum of squares of fitted rate-of-change slopes for respective features, such as the slope found in step 506. For example, in some embodiments, the regularization term is given by $\Omega(\theta)=\Sigma_j \beta_j^2$, where $\beta_j$ is the fitted rate-of-change slope for the jth hidden node. The RBM may minimize or optimize its objective function during the learning process. Therefore, the regularization term disclosed herein may provide a penalty for poor trendability in the objective function, thereby encouraging the RBM to output extracted features with better trendability. Such enhancement may improve the features' predictive power for RUL estimation.

By adding gradients from the regularization term $\Omega(\theta)$ to update the learning term, the system may improve the slope of the hidden nodes through the iterations. For example, if measurements are sampled at equal time intervals so $x_k=k$, the gradient of $\Omega(\theta)$ may be derived with the help of the equations $$\frac{\partial \beta_j}{\partial \omega_{ij}} = \frac{\sum_{k}^{N}\left(k - \frac{N+1}{2}\right)y_{kj}(1-y_{kj})V_{kj}}{1^2 + 2^2 + \ldots + N^2 - N\left(\frac{N+1}{2}\right)^2}$$

and $$\frac{\partial \beta_j}{\partial C_j} = \frac{\sum_{k}^{N}\left(k - \frac{N+1}{2}\right)y_{kj}(1-y_{kj})N_v}{1^2 + 2^2 + \ldots + N^2 - N\left(\frac{N+1}{2}\right)^2}.$$

The system may then select a subset of the enhanced features based on a measure of monotonic trending of a respective enhanced feature (operation 510). In some embodiments, as in operation 114, this may involve selecting features likely to achieve the RBM's learning goals and/or based on their likely predictive power for RUL estimation. In some embodiments, the measure of monotonic trending may be trendability, determined according to a count of first-order and second-order differences of a respective feature from a hidden node having a same sign. In some embodiments, the system may further evaluate a measure of prognosibility based at least on a standard deviation in the measure of monotonic trending with respect to variations among features and hidden nodes. In some embodiments, the system may select features based on prognosibility.

The system may then aggregate the selected subset of features into a health value (operation 512). The health value may quantify the health or degree of degradation of the machine, tool, part, or other system. In some embodiments, the health value may be based on a minimum quantization error (MQE) obtained via a Self-Organizing Map (SOM), as described below. In some embodiments, the system may use the health value to determine the degradation of the machine, tool, part or other system, or determine the end of its useful life, as well as to predict RUL.

The system may then predict a remaining useful life (RUL) as a weighted average of features best matching a historical degradation pattern in the health value (operation 514). In some embodiments, the system may use a similarity-based method to predict the remaining useful life. In such a method, the system may calculate health values, as in operation 512, of datasets in a training library. Having more training datasets to enrich the training library may improve the accuracy of RUL prediction. The system may represent the degradation patterns in the training datasets based on degradation curves containing health values.

The system may also calculate health values for the testing data being evaluated, for example measurement data such as 110. The system may compare health values from the testing data to training degradation curves using a distance measure. In some embodiments, the distance measure may be Euclidean distance. The system may determine a best match to the testing data among the datasets in the training library based on having a smallest distance measure. The system may estimate a failure time for test datasets based on the actual historical failure time of similar datasets in the training library. In some embodiments, for a respective model in the training library, the system estimates a RUL value by the difference between a time stamp when the model best matches the testing data and the end of life of the model. Finally, in some embodiments, the system may predict RUL by a weighted average of RUL values calculated from the respective training models, weighted according to the distance measure. In some embodiments, the smaller the distance measure, the larger the weight used. In some embodiments, the system normalizes each weight to range from 0 to 1 by dividing the reciprocal of the distance measure by the sum of the reciprocals of all the distance measures.

Self-Organizing Map (SOM)

Figure 6:
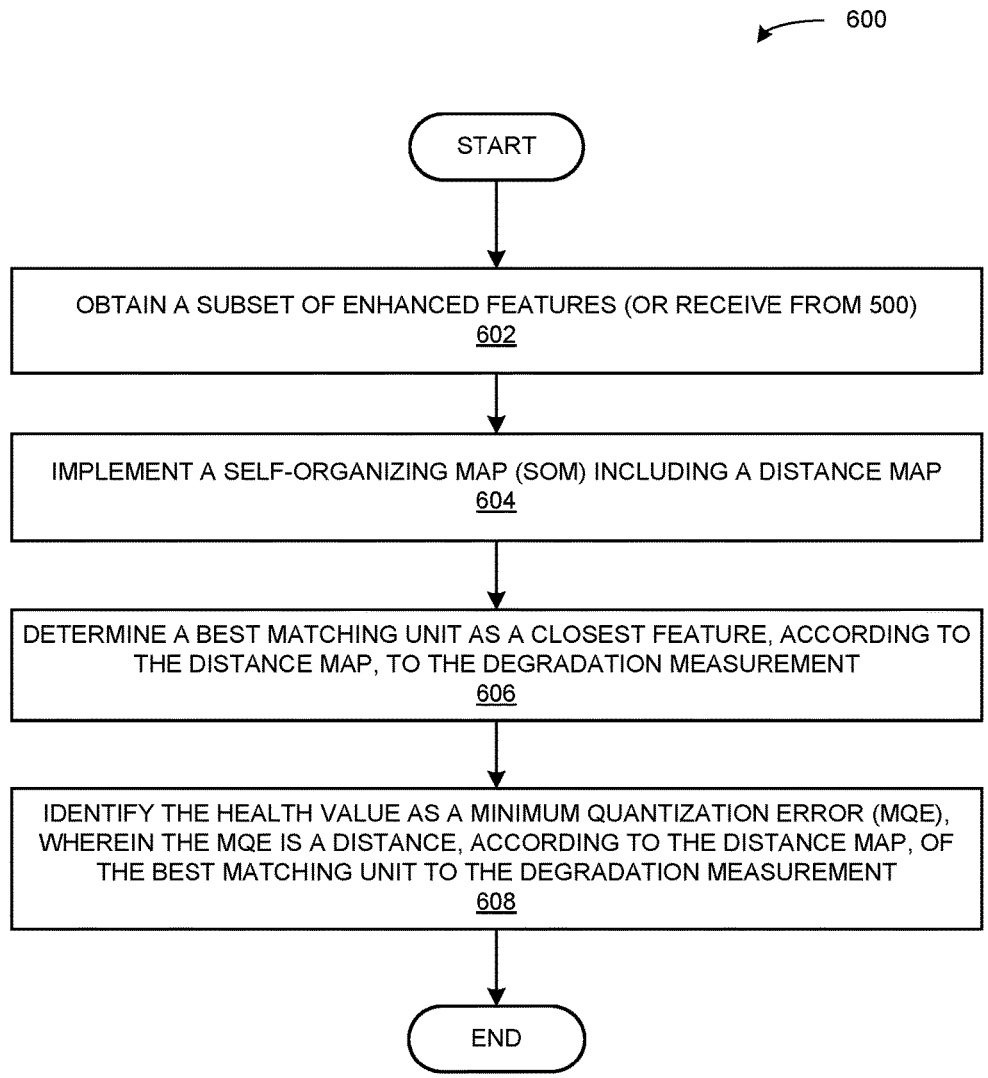
FIG. 6 presents a block diagram illustrating a method for comparing extracted features to a degradation measurement according to embodiments of the present invention.

FIG. 6 presents a block diagram illustrating a method 600 for comparing extracted features to a degradation measurement according to embodiments of the present invention. Method 600 is based on a self-organizing map (SOM) including a distance map or measure. Note that method 600 may be understood as providing more detail of operation 510, i.e. selecting a subset of the enhanced features based on a measure of monotonic trending of a respective enhanced feature, during method 500. In some embodiments, method 600 also clarifies operation 512, i.e. aggregating the selected subset of features into a health value. During operation, the system obtains a subset of enhanced features (operation 602). Alternatively, in step 602, the system may receive the subset of enhanced features from method 500.

The system may then implement a self-organizing map (SOM) including a distance map (operation 604) using a healthy baseline training measurement. SOMs can map high-dimensional data to a lower-dimensional grid. In some embodiments, the system uses an SOM to convert a non-linear relationship in a training or testing dataset into a simple geometric distribution, and to represent this via a distance map. In some embodiments, the distance map is a scalar product of two vectors. The distance map may act on a weight vector associated with a feature and a vector representation of an input. In some embodiments, the distance map may be a Euclidean distance. In some embodiments, the distance map may be a Mahalanobis distance or a cosine similarity measure. In some embodiments, the system may initialize the map with m neurons where $m=5\sqrt{N}$ and N is the number of samples.

The system may then determine a best matching unit (BMU) as a closest vector, according to the distance map, to the degradation measurement (operation 606). During the map training iterations, the system may initialize weight vectors of the same dimension as the input vectors. The system may calculate the distance between each input and the space of selected features via a weight vector associated with each neuron, to find the best matching units (BMU) to the input vectors after each iteration. The system may update the weight vector every iteration such that the neurons move closer to the input space. In some embodiments, the system updates the weight vectors based on: $W_l(t+1)=W_l(t)+\alpha(t)h_{l,W_{BMU}}(t)(D-W_l(t))$. Here t is the iteration step, $h_{l,W_{BMU}}$ denotes the topological neighborhood kernel centered on the BMU (l=1, ..., m), $W_{BMU}$ is the weight of the best matching unit, D is an input vector, and $\alpha(t)$ is the learning rate, which monotonically decreases with t.

The system may then identify the health value as a minimum quantization error (MQE), wherein the MQE is a distance, according to the distance map, of the best matching unit to the degradation measurement (operation 608). In some embodiments, the system may use healthy (nominal or non-faulty) machine data to train a baseline SOM map. The system may then compare the feature vector of testing data with the weight vectors of all the units in the baseline map. In some embodiments, the system may calculate the Minimum Quantization Error (MQE), which quantifies the machine's health value, as the minimal such distance: health value=MQE=$\min_i \|D-W_i\|$. In some embodiments, a larger MQE or health value indicates a larger deviation from the healthy condition.

Performance, Experiment Results, and Applications

Figure 7:
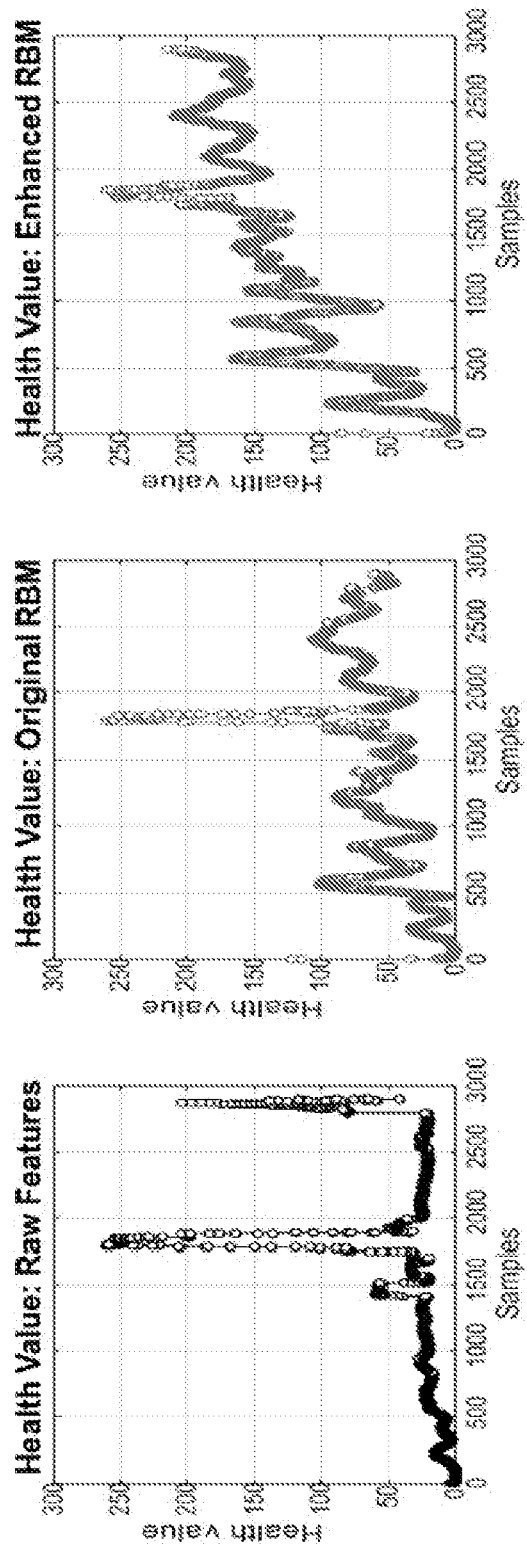
FIG. 7 illustrates exemplary enhancement of health value monotonicity by the present invention, based on experimental results.

FIG. 7 illustrates exemplary enhancement of health value monotonicity by the present invention, based on experimental results. The inventors performed trials with mechanical bearings to validate prognosibility and RUL prediction accuracy through multiple run-to-failure datasets. FIG. 7 shows the health value as a function of sample index (or equivalently, time) for the raw features, original RBM, and enhanced RBM. Exemplary results show that the health value from the enhanced RBM has significantly better trending than the raw features or original RBM, as in FIG. 7. For example, two datasets from the first trial improved positive trendability from 1.08 in the original RBM to 1.19 in the enhanced RBM, and from 1.06 in the original RBM to 1.09 in the enhanced RBM. Both of these represent significant improvements in trendability, thereby improving the predictive power and accuracy of RUL estimation earlier in the life cycle of the bearings.

Figure 8:
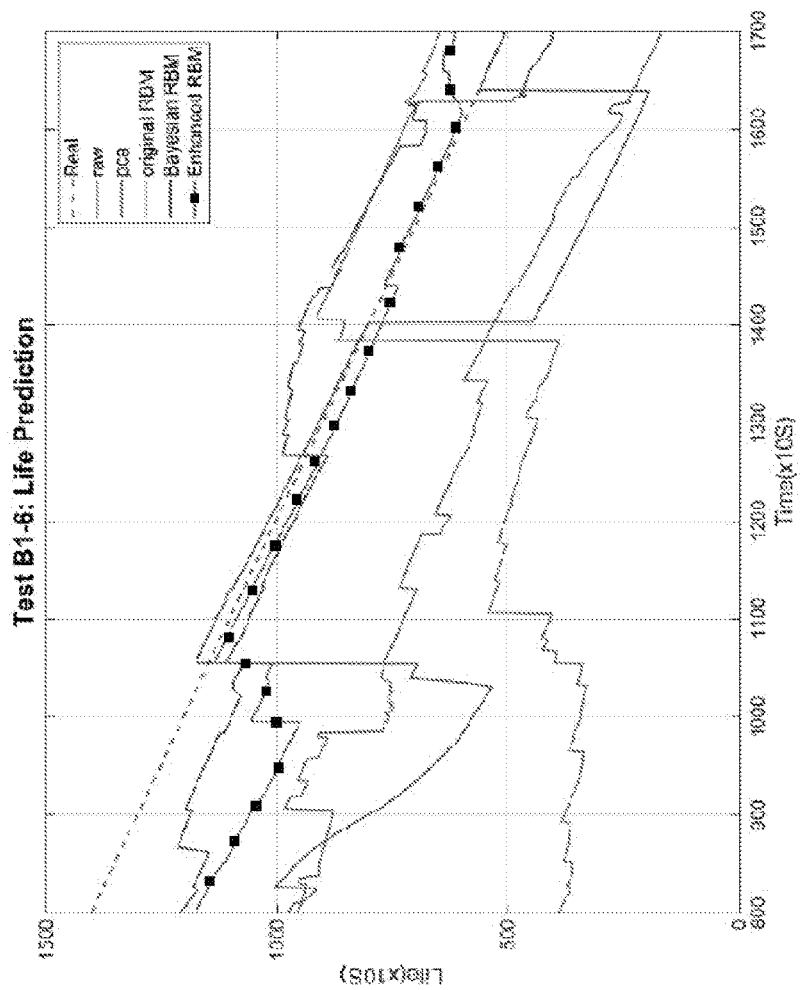
FIG. 8 illustrates RUL prediction performance of the present invention, based on experimental results.

FIG. 8 illustrates RUL prediction performance of the present invention, based on experimental results from the second trial with bearings. FIG. 8 shows the best estimated RUL as a function of time, based on various RUL estimation methods. The dashed curve represents the actual approach to failure. In this case, the actual failure occurred at 2448 samples (24,480 seconds), so the dashed line is shown decreasing linearly to an x-intercept of 2448. The other curves shown represent RUL estimates, so they may change non-linearly when, for example, the RUL estimate becomes based on a different historical pattern or set of patterns. The curve with black square markers represents the RUL estimate based on the enhanced RBM. As shown, the enhanced RBM becomes the best RUL estimate around 1060 samples (10,600 seconds), long before the actual failure, and remains the best estimate for much of the remaining life of the bearing.

Exemplary Apparatus

Figure 9:
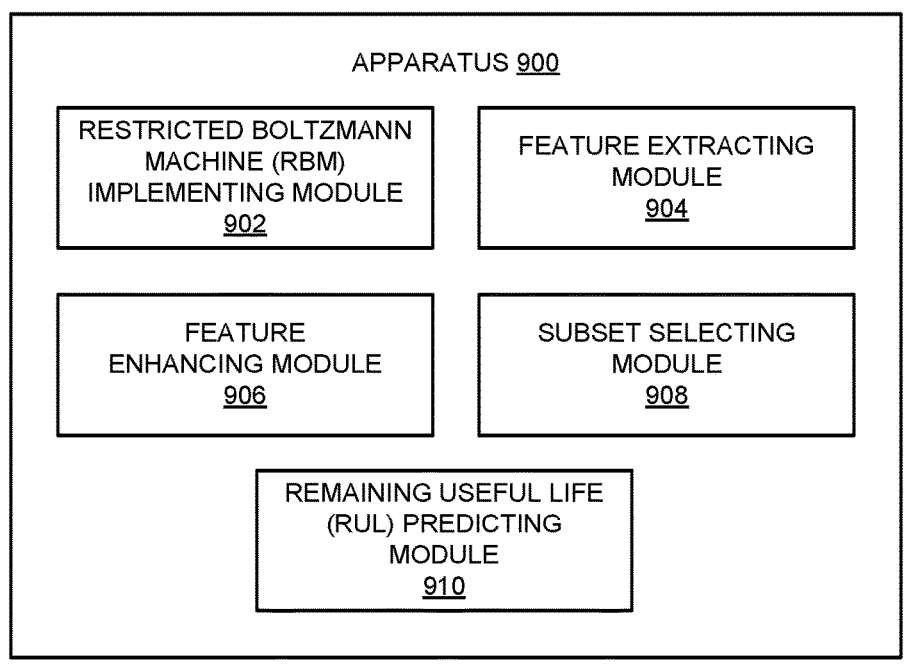
FIG. 9 presents a block diagram illustrating an exemplary apparatus for enhanced RUL prediction, in accordance with embodiments of the present invention.

FIG. 9 presents a block diagram illustrating an exemplary apparatus for enhanced RUL prediction, in accordance with embodiments of the present invention. Apparatus 900 can comprise a plurality of modules which may communicate with one another via a wired or wireless communication channel. Apparatus 900 may be realized using one or more integrated circuits, and may include fewer or more modules than those shown in FIG. 9. Further, apparatus 900 may be integrated in a computer system, or realized as a separate device which is capable of communicating with other computer systems and/or devices. Specifically, apparatus 900 can comprise a Restricted Boltzmann Machine (RBM) implementing module 902, a feature-extracting module 904, a feature-enhancing module 906, a subset-selecting module 908, and a remaining useful life (RUL) predicting module 910. Note that apparatus 900 may also include additional modules not depicted in FIG. 9.

In some embodiments, RBM-implementing module 902 can implement an RBM including a loss function. Feature-extracting module 904 may extract a set of features from a degradation measurement via the RBM. Feature-enhancing module 906 may enhance the features within the RBM, according to embodiments of the present invention. Subset-selecting module 908 may select a subset of the enhanced features based on a measure of monotonic trending. RUL-predicting module 910 may predict a remaining useful life (RUL) as a weighted average of features best matching a historical degradation pattern in the health value. Note that enhanced RBM module 302 illustrated in FIG. 3 may provide any and all functions of the various modules depicted in FIG. 9.

Exemplary System

Figure 10:
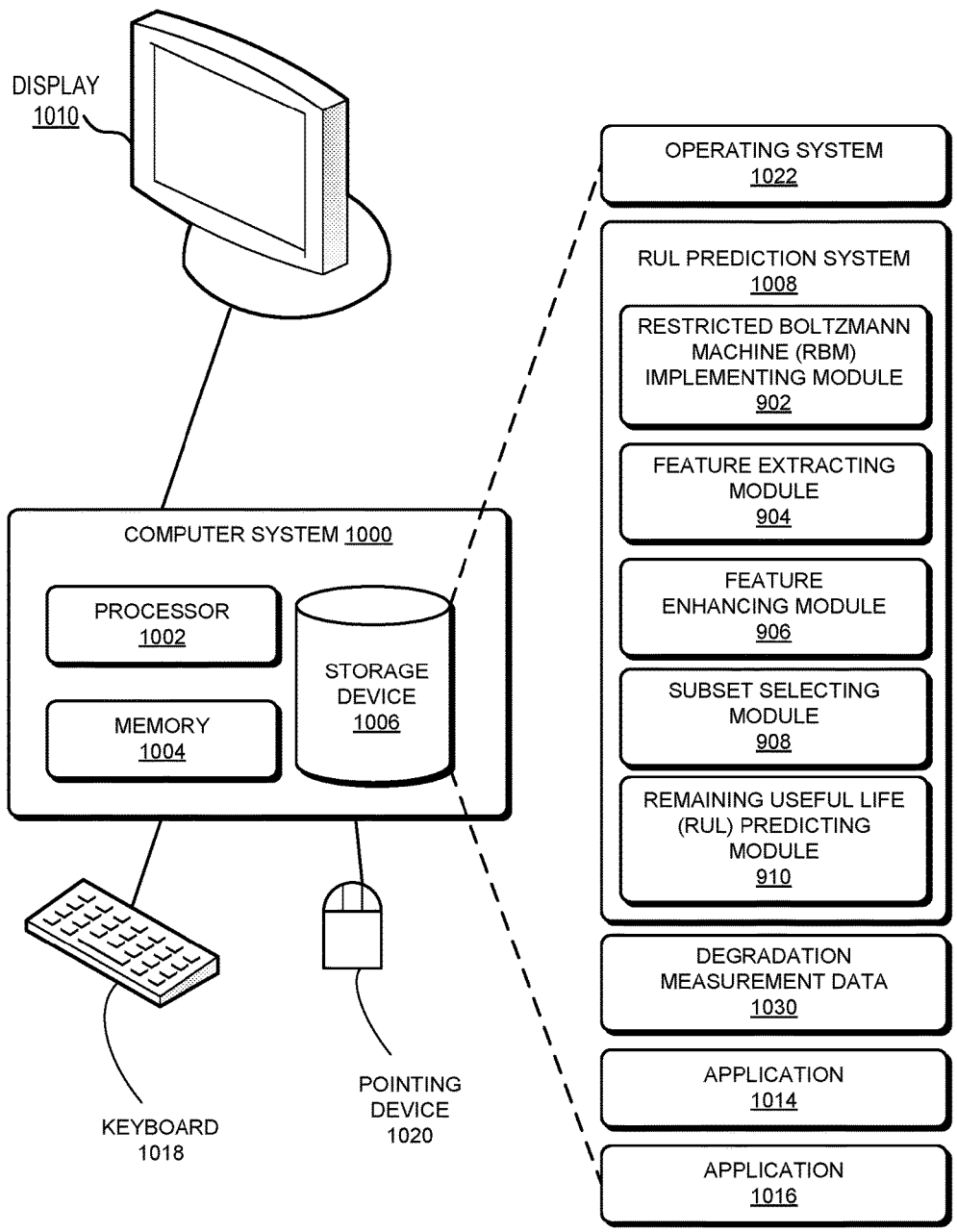
FIG. 10 presents a block diagram illustrating an exemplary computer system for enhanced RUL prediction, in accordance with embodiments of the present invention.

FIG. 10 presents a block diagram illustrating an exemplary computer system for enhanced RUL prediction, in accordance with embodiments of the present invention. In some embodiments, computer system 1000 may be a server. In some embodiments, system 1000 includes a processor 1002, a memory 1004, and a storage device 1006. In some embodiments, 1002 may include a set of processors. Storage device 1006 may store a number of applications, such as applications 1014 and 1016, which may make use of enhanced RUL prediction according to embodiments of the present invention, and operating system 1022. Storage device 1006 also stores RUL prediction system 1008 that may include a Restricted Boltzmann Machine (RBM) implementing module 902, a feature-extracting module 904, a feature-enhancing module 906, a subset-selecting module 908, and a remaining useful life (RUL) predicting module 910. System 1000 and/or RBM-implementing module 902 may receive or generate degradation measurement data 1030 comprising measurements and/or features data and may copy degradation measurement data to a memory section accessible to RUL prediction system 1008. During operation, one or more applications, such as RUL prediction system 1008, are loaded from storage device 1006 into memory 1004 and then executed by processor set 1002. While executing the program, processor set 1002 performs the aforementioned functions. System 1000 may be coupled to a display 1010, a keyboard 1018, and a pointing device 1020.

RBM-implementing module 902 can implement an RBM including a loss function. Feature-extracting module 904 may extract a set of features from a degradation measurement via the RBM. Feature-enhancing module 906 may enhance the features within the RBM, according to embodiments of the present invention. Subset-selecting module 908 may select a subset of the enhanced features based on a measure of monotonic trending. RUL-predicting module 910 may predict a remaining useful life (RUL) as a weighted average of features best matching a historical degradation pattern in the health value. Note that enhanced RBM module 302 illustrated in FIG. 3 may provide any and all functions of the various modules depicted in FIG. 10.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a fieldprogrammable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for predicting a remaining useful life (RUL) of an engineered instrument, the method comprising:
    acquiring a degradation measurement for the engineered instrument;
    implementing, by a computer system comprising a set of processors, a Restricted Boltzmann Machine (RBM) including a loss function;
    extracting a set of features from the degradation measurement;
    enhancing the features within the RBM, which further comprises:
        fitting a rate-of-change slope for a respective feature; and
        adding a regularization term, based on the fitted slope and encouraging monotonic trending of the respective feature, to the loss function;
    selecting a subset of the enhanced features based on a measure of monotonic trending of a respective enhanced feature;
    aggregating the selected subset of features into a health value of the engineered instrument; and
    predicting the remaining useful life (RUL) of the engineered instrument as a weighted average of features best matching a historical degradation pattern in the health value, thereby facilitating maintenance of the engineered instrument.

2. The method of claim 1:
    wherein the fitted rate-of-change slope for the respective feature is a slope of a linear regression of the respective feature over time in the degradation measurement; and
    wherein the regularization term comprises a sum of squares of fitted rate-of-change slopes for respective features.

3. The method of claim 2, wherein the linear regression further comprises a weighted least squares regression or a sparse linear regression.

4. The method of claim 1, wherein aggregating the selected subset of features into the health value further comprises:
    implementing, by the computer system, a Self-Organizing Map (SOM) including a distance map; and
    comparing, via the SOM, the extracted features to the degradation measurement, which further comprises:
        determining a best matching unit as a closest feature, according to the distance map, to the degradation measurement; and
        identifying the health value as a minimum quantization error (MQE), wherein the MQE is a distance, according to the distance map, of the best matching unit to the degradation measurement.

5. The method of claim 4, wherein the distance map includes one or more of:
    a Euclidean distance;
    a Mahalanobis distance; and
    a cosine similarity measure;
and wherein the distance map acts on a weight vector associated with a feature and a vector representation of an input.

6. The method of claim 1, wherein extracting the set of features comprises processing the degradation measurement according to one or more of:
    the RBM;
    a mean statistic;
    a median statistic;
    a standard deviation statistic;
    a root-mean-square (RMS) statistic;
    a Fast Fourier Transform (FFT) signal processing heuristic; and
    a wavelet analysis signal processing heuristic.

7. The method of claim 1:
    wherein the measure of monotonic trending of the respective feature comprises a count of first-order differences of the respective feature from a hidden node having a same sign, and a count of second-order differences of the respective feature from the hidden node having the same sign; and
    further comprising evaluating a measure of prognosibility based at least on a standard deviation in the measure of monotonic trending with respect to features and hidden nodes.

8. The method of claim 1, further comprising implementing a deep learning structure by stacking a layer, comprising a regression or classification method, on an output of the RBM.

9. The method of claim 8, wherein the stacked layer comprises a discriminative classification method to integrate feature extraction and prediction as a unified task.

10. A non-transitory computer-readable storage medium storing instructions that when executed by a computer cause the computer to perform a method for predicting a remaining useful life (RUL) of an engineered instrument, the method comprising:
    acquiring a degradation measurement for the engineered instrument;
    implementing a Restricted Boltzmann Machine (RBM) including a loss function;
    extracting a set of features from the degradation measurement;
    enhancing the features within the RBM, which further comprises:
        fitting a rate-of-change slope for a respective feature; and
        adding a regularization term, based on the fitted slope and encouraging monotonic trending of the respective feature, to the loss function;
    selecting a subset of the enhanced features based on a measure of monotonic trending of a respective enhanced feature;
    aggregating the selected subset of features into a health value of the engineered instrument; and
    predicting the remaining useful life (RUL) of the engineered instrument as a weighted average of features best matching a historical degradation pattern in the health value, thereby facilitating maintenance of the engineered instrument.

11. The non-transitory computer-readable storage medium of claim 10:
wherein the fitted rate-of-change slope for the respective feature is a slope of a linear regression of the respective feature over time in the degradation measurement; and
wherein the regularization term comprises a sum of squares of fitted rate-of-change slopes for respective features.

12. The non-transitory computer-readable storage medium of claim 10, wherein aggregating the selected subset of features into the health value further comprises:
implementing, by the computer system, a Self-Organizing Map (SOM) including a distance map; and
comparing, via the SOM, the extracted features to the degradation measurement, which further comprises:
determining a best matching unit as a closest feature, according to the distance map, to the degradation measurement; and
identifying the health value as a minimum quantization error (MQE), wherein the MQE is a distance, according to the distance map, of the best matching unit to the degradation measurement.

13. The non-transitory computer-readable storage medium of claim 12, wherein the distance map includes one or more of:
a Euclidean distance;
a Mahalanobis distance; and
a cosine similarity measure;
and wherein the distance map acts on a weight vector associated with a feature and a vector representation of an input.

14. The non-transitory computer-readable storage medium of claim 10:
wherein the measure of monotonic trending of the respective feature comprises a count of first-order differences of the respective feature from a hidden node having a same sign, and a count of second-order differences of the respective feature from the hidden node having the same sign; and
wherein the method further comprises evaluating a measure of prognosibility based at least on a standard deviation in the measure of monotonic trending with respect to features and hidden nodes.

15. The non-transitory computer-readable storage medium of claim 10, wherein extracting the set of features comprises processing the degradation measurement according to one or more of:
the RBM;
a mean statistic;
a median statistic;
a standard deviation statistic;
a root-mean-square (RMS) statistic;
a Fast Fourier Transform (FFT) signal processing heuristic; and
a wavelet analysis signal processing heuristic.

16. A computing system, the system comprising:
a set of processors; and
a non-transitory computer-readable medium coupled to the set of processors storing instructions thereon that, when executed by the processors, cause the processors to perform a method for predicting a remaining useful life (RUL) of an engineered instrument, the method comprising:
acquiring a degradation measurement for the engineered instrument;
implementing a Restricted Boltzmann Machine (RBM) including a loss function;
extracting a set of features from a degradation measurement;
enhancing the features within the RBM, which further comprises:
fitting a rate-of-change slope for a respective feature; and
adding a regularization term, based on the fitted slope and encouraging monotonic trending of the respective feature, to the loss function;
selecting a subset of the enhanced features based on a measure of monotonic trending of a respective enhanced feature;
aggregating the selected subset of features into a health value of the engineered instrument; and
predicting the remaining useful life (RUL) value of the engineered instrument as a weighted average of features best matching a historical degradation pattern in the health value, thereby facilitating maintenance of the engineered instrument.

17. The computing system of claim 16:
wherein the fitted rate-of-change slope for the respective feature is a slope of a linear regression of the respective feature over time in the degradation measurement; and
wherein the regularization term comprises a sum of squares of fitted rate-of-change slopes for respective features.

18. The computing system of claim 16, wherein aggregating the selected subset of features into the health value further comprises:
implementing, by the computer system, a Self-Organizing Map (SOM) including a distance map; and
comparing, via the SOM, the extracted features to the degradation measurement, which further comprises:
determining a best matching unit as a closest feature, according to the distance map, to the degradation measurement; and
identifying the health value as a minimum quantization error (MQE), wherein the MQE is a distance, according to the distance map, of the best matching unit to the degradation measurement.

19. The computing system of claim 18, wherein the distance map includes one or more of:
a Euclidean distance;
a Mahalanobis distance; and
a cosine similarity measure;
and wherein the distance map acts on a weight vector associated with a feature and a vector representation of an input.

20. The computing system of claim 16:
wherein the measure of monotonic trending of the respective feature comprises a count of first-order differences of the respective feature from a hidden node having a same sign, and a count of second-order differences of the respective feature from the hidden node having the same sign; and
wherein the method further comprises evaluating a measure of prognosibility based at least on a standard deviation in the measure of monotonic trending with respect to features and hidden nodes.

* * * * *